US012781880B2

(12) United States Patent
Nepola

(10) Patent No.: US 12,781,880 B2
(45) Date of Patent: Nov. 3, 2026

(54) HIGH VIBRATION CLAMP ASSEMBLY

(71) Applicant: Tom Nepola, Ridgewood, NJ (US)

(72) Inventor: Tom Nepola, Ridgewood, NJ (US)

( * ) Notice: Subject to any disclaimer, the term of this patent is extended or adjusted under 35 U.S.C. 154(b) by 30 days.

(21) Appl. No.: 18/965,433

(22) Filed: Dec. 2, 2024

(65) Prior Publication Data

US 2025/0251059 A1 Aug. 7, 2025

Related U.S. Application Data

(60) Provisional application No. 63/550,720, filed on Feb. 7, 2024.

(51) Int. Cl.
*F16L 3/10* (2006.01)
*F16L 3/237* (2006.01)

(52) U.S. Cl.
CPC ............. *F16L 3/1008* (2013.01); *F16L 3/237* (2013.01)

(58) Field of Classification Search
CPC .......... F16L 3/2235; F16L 3/223; F16L 3/237
USPC ..... 248/68.1, 67.5, 67.7, 689, 49, 65, 70, 73
See application file for complete search history.

(56) References Cited

U.S. PATENT DOCUMENTS 4,183,485 A * 1/1980 Gladieux ................. H02G 3/32 24/336
5,172,877 A * 12/1992 Hattori .................... F16L 3/237 24/535
6,038,852 A * 3/2000 Celi ...................... F16L 3/2235 60/761
7,119,275 B2 * 10/2006 Suzuki ................. H02G 3/0691 138/108
7,484,698 B2 * 2/2009 Budagher ............... F16L 3/237 174/40 R
8,770,537 B2 * 7/2014 Go ........................ F16L 55/035 248/62
9,482,253 B2 * 11/2016 Handa ..................... F16L 3/237
10,295,084 B2 * 5/2019 Izawa ...................... F16L 3/237
10,703,311 B2 * 7/2020 Davenport .............. F16L 3/237
11,677,220 B2 * 6/2023 Morrow ............... H02G 3/0406 248/68.1
2003/0089828 A1 * 5/2003 Korczak ................. F16B 37/02 248/68.1
2004/0159751 A1 * 8/2004 Boon ....................... F16L 3/237 248/68.1
2005/0120652 A1 * 6/2005 Cacciani ................... F16L 3/26 52/302.1

(Continued)

FOREIGN PATENT DOCUMENTS

CN 111120737 A * 5/2020 ............. F16L 3/223

*Primary Examiner* — Terrell L Mckinnon
*Assistant Examiner* — Michael McDuffie
(74) *Attorney, Agent, or Firm* — Myers Wolin, LLC

(57) ABSTRACT

A clamp assembly is provided for retaining a structure in a high vibration environment. The clamp assembly includes a base for fixing the clamp assembly to a support, the base having a mounting plate, two legs at opposite edges of the mounting plate for spacing the mounting plate apart from the support, and a tab extending from a wall of each of the two legs towards a center of the mounting plate. The clamp also includes a fixation structure including a bolt and nut for fixing a secondary structure to the mounting plate, with the nut including or fixed to a nut plate extending laterally from an axial direction of the nut. The nut plate is discrete from and captivated adjacent the mounting plate by the at least one tab extending from the wall of the at least one leg.

17 Claims, 7 Drawing Sheets

(56) References Cited

U.S. PATENT DOCUMENTS

| | | | | |
|---|---|---|---|---|
| 2007/0163748 | A1* | 7/2007 | Rasmussen .......... | H05K 7/2079 165/53 |
| 2016/0010764 | A1* | 1/2016 | Dworak, Jr. .......... | F16L 3/1215 248/65 |
| 2020/0149662 | A1* | 5/2020 | Lewis ................... | F16L 3/1211 |

* cited by examiner

HIGH VIBRATION CLAMP ASSEMBLY

CROSS REFERENCE TO RELATED APPLICATIONS

This application takes priority from U.S. Provisional Patent Application No. 63/550,720 filed Feb. 7, 2024, the contents of which are incorporated by reference herein in their entirety.

FIELD OF THE INVENTION

The invention relates to clamp assemblies for use in high vibration environments. In particular, the invention relates to clamps used in fire and heat detection systems, where the clamp holds a cable or tube containing an electrical circuit with a heat sensitive resistance.

BACKGROUND

This disclosure relates to clamp assemblies for use in high vibration environments, namely fire and heat detection systems in aircrafts. In particular the mounting clamps described are used to fix cables or tubes in the context of sensor circuits.

Typically, fire and heat detection systems in aircrafts utilize circuits routed through areas to be monitored, such as engine bays. A typical circuit implementation may include two electrical conductors in a tube packed with a material with a resistance sensitive to heat. In a typical embodiment, the tube is formed from Inconel, or a different material that is resist to heat and corrosion, and the tube may be packed with eutectic salt, which provides an electrical resistance between the two electrical conductors that drops quickly at an alarm temperature.

A first conductor is then connected to ground, with the Inconel tube itself being usable as ground in some embodiments, with the second conductor connecting to the fire detection system. The system then monitors the resistance between the second conductor and ground to evaluate temperature in the area to be monitored, and to determine if an overheat or fire alert is to be issued.

In such an implementation, the Inconel tube is mounted within the engine bay or other sensitive areas, and the mounting structure, typically a clamp assembly, is exposed to severe vibratory forces, and therefore must be prevented from shaking loose. Typically, the clamp is secured with a staked nut using locking knurls, but this sometimes shakes loose. The assembly is often in a difficult to access area, and vibrations occur during flight, such that a clamp shaking loose can lead to major issues, including system failures.

There is a need for a clamp that can more securely retain components, such as tubes associated with aircraft overheat detection systems, even while exposed to severe vibrations.

SUMMARY

In some embodiments, a clamp assembly is provided for retaining a substantially cylindrical structure in a high vibration environment. The clamp assembly includes a base for fixing the claim assembly to a support, with the base having a mounting plate, at least one leg at a first edge of the mounting plate for spacing the mounting plate apart from the support, a first partial jaw extending from a first side of the mounting plate, and at least one tab extending from a wall of the at least one leg towards a center of the mounting plate.

The clamp assembly further includes a cap for retaining the substantially cylindrical structure against the base. The cap has a fixation plate for fixing to the mounting plate and a second partial jaw extending from a first side of the fixation plate for mating with the first partial jaw.

The clamp assembly further includes a fixation structure comprising a bolt and nut, with the nut having or fixed to a nut plate extending laterally from an axial direction of the nut. When the fixation plate of the cap is fixed to the mounting plate of the base, the first partial jaw mates with the second partial jaw to define a retention loop for retaining the substantially cylindrical structure, and the nut plate is discrete from and captivated adjacent the mounting plate by the at least one tab extending from the wall of the at least one leg.

In some embodiments, the base includes a third partial jaw extending from a second side of the mounting plate opposite the first side and the cap comprises a fourth partial jaw extending from a second side of the fixation plate opposite the first side for mating with the third partial jaw. When the fixation plate of the cap is fixed to the mounting plate of the base, the third partial jaw mates with the fourth partial jaw to define a second retention loop for retaining a second substantially cylindrical structure or a second portion of the substantially cylindrical structure than the retention loop.

In some such embodiments, the at least one leg is two legs, and a first of the two legs extends from the first edge of the mounting plate and a second of the two legs extends from a second edge of the mounting plate opposite the first edge. The two legs locate the mounting plate relative to and spaced apart from the support. Further, the at least one tab is two tabs, with a first of the two tabs extending towards the center of the mounting plate from the wall of the first leg, and a second of the two tabs extending towards the center of the mounting plate from a wall of the second leg, such that the first tab and the second tab extend substantially towards each other and combine to captivate the nut plate.

In some such embodiments, the mounting plate is substantially rectangular, such that it has four sides, and the first edge is at a third side and the second edge is at a fourth side opposite the third side, such that the legs and partial jaws all extend from distinct sides of the mounting plate.

In some embodiments, the substantially cylindrical structure is a portion of an electrical circuit.

In some embodiments, the substantially cylindrical structure is a bushing for retaining a cable or tube forming a portion of an electrical circuit.

In some such embodiments, the cable or tube is an Inconel tube containing electrical conductors. In some such embodiments, the electrical circuit is an overheat detection system, and the electrical conductors or a material separating the electrical conductors are temperature sensitive, such that a high temperature decreases the resistance of the circuit.

In some embodiments, the at least one leg is two legs, where a first of the two legs extends from the first edge of the mounting plate and a second of the two legs extends from a second edge of the mounting plate opposite the first edge, such that the two legs locate the mounting plate relative to and spaced apart from the support. The at least one tab is then two tabs, with a first of the two tabs extending towards the center of the mounting plate from the wall of the first leg, and a second of the two tabs extending towards the center of the mounting plate from a wall of the second leg, such that the first tab and the second tab extend substantially towards each other.

In some such embodiments, the first tab and the second tab comprise a portion of the corresponding first and second leg respectively bent relative to the remainder of the corresponding leg. In some such embodiments, each of the first tab and the second tab is stamped from the corresponding leg.

In some embodiments, each leg of the at least one leg terminates in a corresponding installation segment for installing the clamp assembly on the support, where the installation segment is bent relative to the corresponding leg. In some such embodiments, the support is a rail, and wherein the rail extends from a first leg of the at least one leg to a second leg of the at least one leg.

Also provided is a clamp assembly for retaining a structure in a high vibration environment. The clamp assembly includes a base for fixing the clamp assembly to a support, the base having a mounting plate, two legs at opposite edges of the mounting plate for spacing the mounting plate apart from the support, and a tab extending from a wall of each of the two legs towards a center of the mounting plate.

The clamp also includes a fixation structure including a bolt and nut for fixing a secondary structure to the mounting plate, with the nut including or fixed to a nut plate extending laterally from an axial direction of the nut. The nut plate is discrete from and captivated adjacent the mounting plate by the at least one tab extending from the wall of the at least one leg.

In some such embodiments, the base includes a first partial jaw extending from a first side of the mounting plate for mating with a second partial jaw extending from a fixation plate for fixing to the mounting plate, and the first and second partial jaws combine to define a retention loop for retaining a substantially cylindrical structure.

In some such embodiments, the base includes a third partial jaw extending from a second side of the mounting plate opposite the first side for mating with a fourth partial jaw extending from the fixation plate, and where the third and fourth partial jaws combine to define a second retention loop for retaining a second substantially cylindrical structure or a second portion of the substantially cylindrical structure.

In some such embodiments, the mounting plate is substantially rectangular, such that it has four sides, and the two opposite edges are at a third and fourth side respectively, such that the legs and partial jaws all extend from distinct sides of the mounting plate.

DETAILED DESCRIPTION OF THE PREFERRED EMBODIMENTS

Figure 1C:
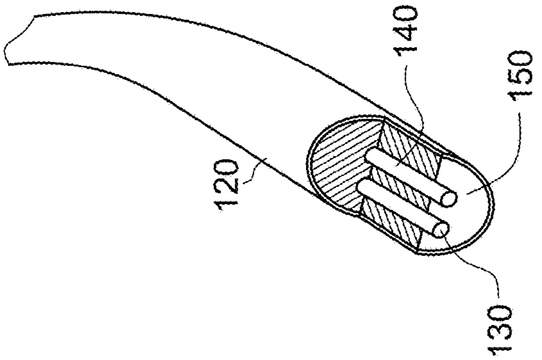
FIG. 1C is a sectioned view of the tube of FIG. 1B.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

A clamp assembly is provided for use in high vibration environments. For example, such a clamp assembly may be utilized in fire and heat detection systems in aircrafts. In such an embodiment, mounting clamps are used to retain cylindrical structures, such as cables or tubes operating as components of sensor circuits, without loosening due to excessive mechanical forces, such as impact or vibration.

Figure 1A:
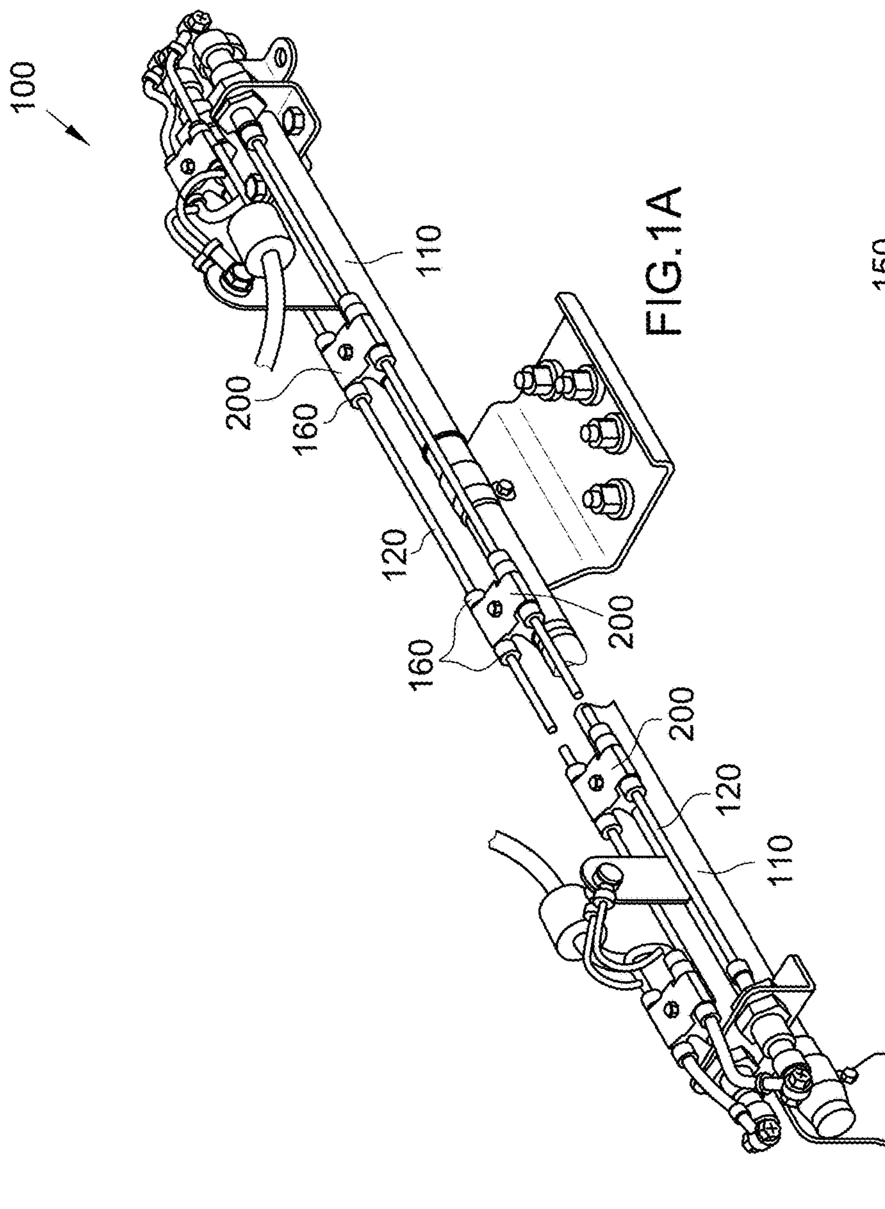
FIG. 1A is a schematic illustration of a fire and heat detection system for use in aircrafts.
Figure 1B:
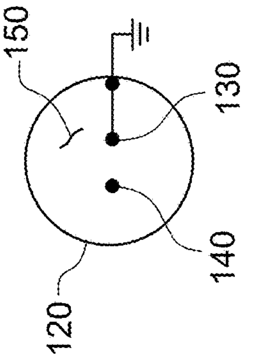
FIG. 1B is a cross section of a tube in the system of FIG. 1A.

FIG. 1A is a schematic illustration of a fire and heat detection system 100 for use in aircrafts. FIG. 1B is a cross section of a tube 120 in the system 100 and FIG. 1C is a sectioned view of the tube 120. As shown, the system includes multiple examples of a clamp assembly 200 mounted on a rail 110 and retaining a tube 120 containing components of a heat detection circuit.

The tube 120 then contains two electrical conductors 130, 140, with a first conductor 130 being connected to ground and a second conductor 140 being a live wire connected to the system. A substance 150 packed into the tube 120, such as eutectic salt is then sensitive to heat, such that if the local temperature rises above some threshold temperature, the resistivity of the substance 150 drops, thereby reducing a resistance between the two conductors 130, 140. The tube 120 is then fixed in the clamp using bushings 160 such that it can be retained at the specific location at which heat detection is required.

Figure 2:
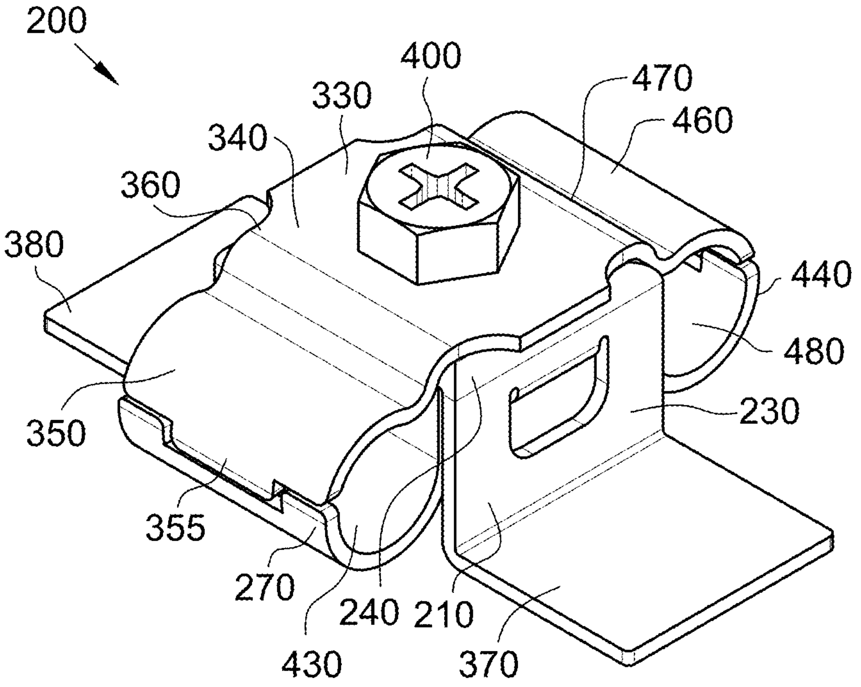
FIG. 2 is a perspective view of a clamp assembly in accordance with this disclosure.
Figure 3:
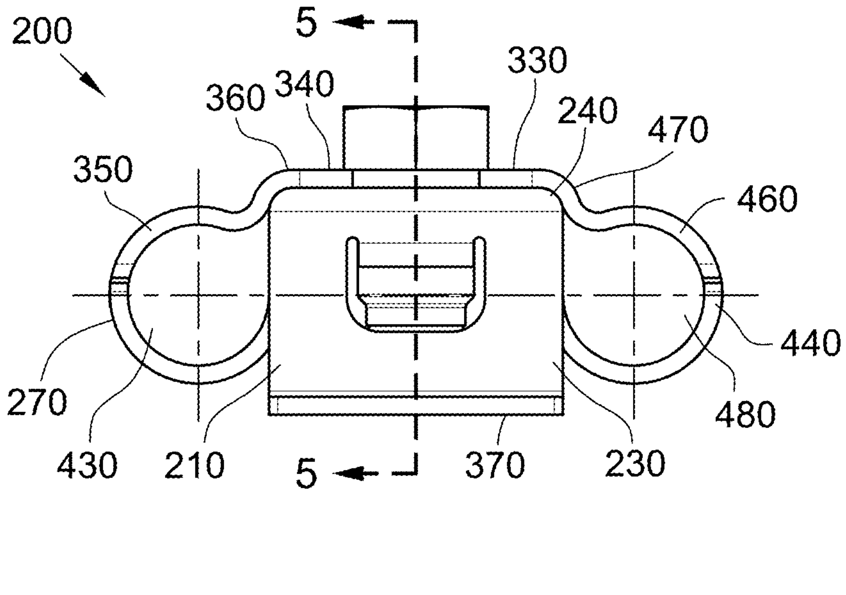
FIG. 3 is a side view of the clamp assembly of FIG. 2.
Figure 4:
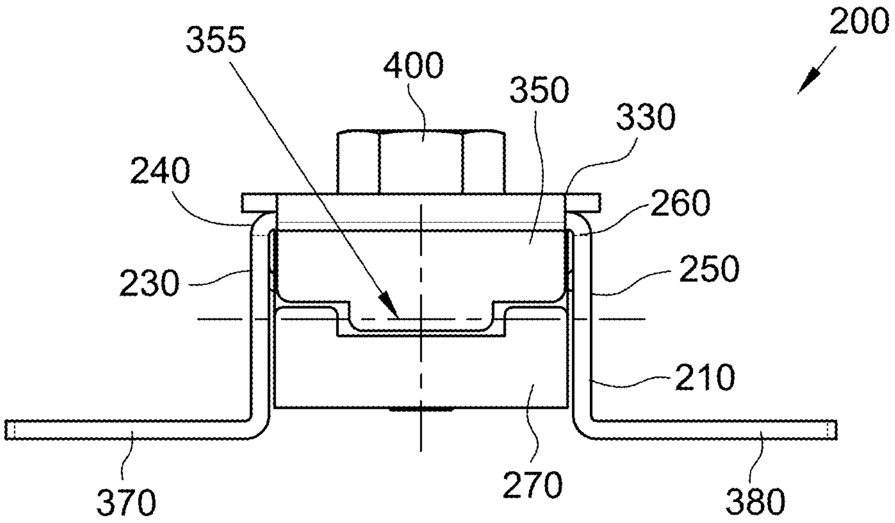
FIG. 4 is a side view of the clamp assembly of FIG. 2.
Figure 5:
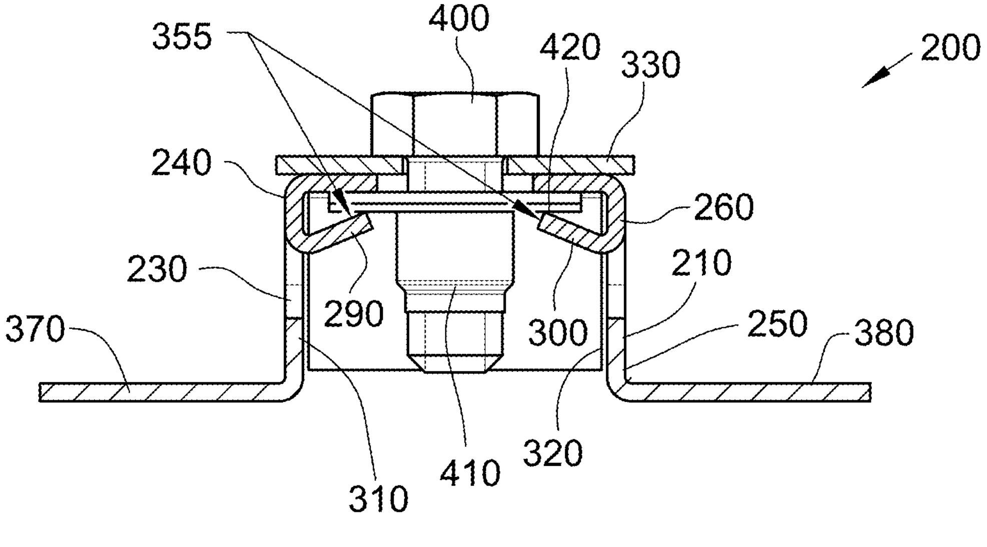
FIG. 5 is a section view of the clamp assembly of FIG. 2 taken along line 5-5 of FIG. 3.
Figure 6:
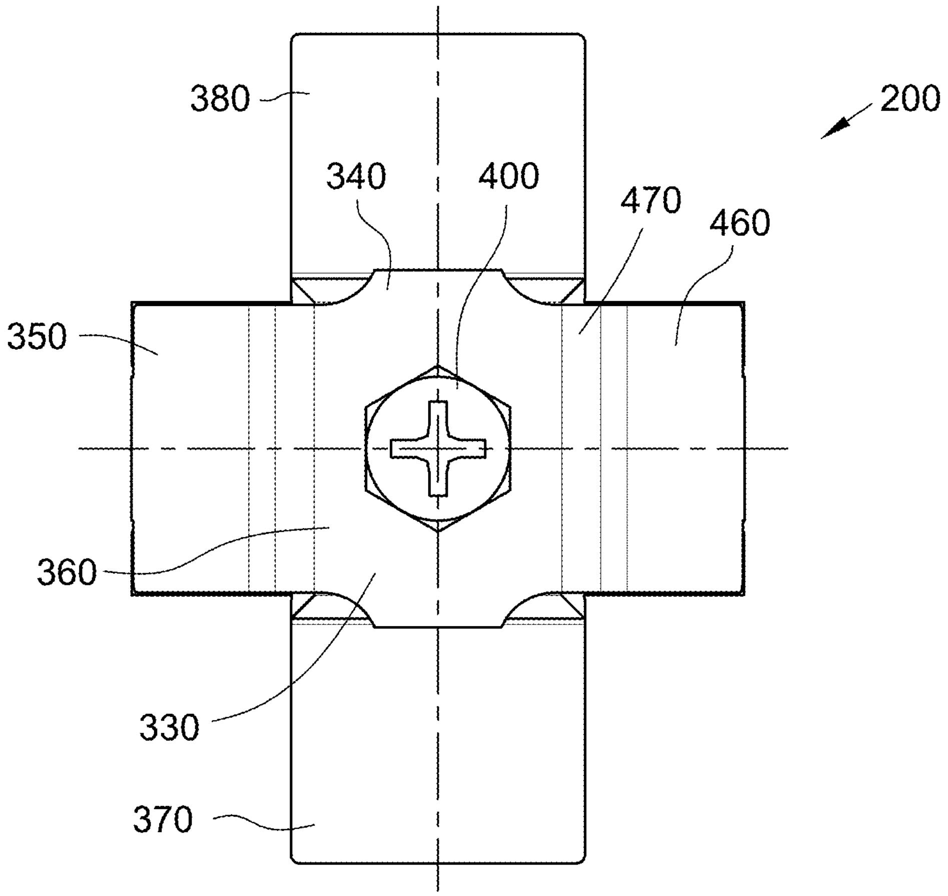
FIG. 6 is a top view of the clamp assembly of FIG. 2.
Figure 7:
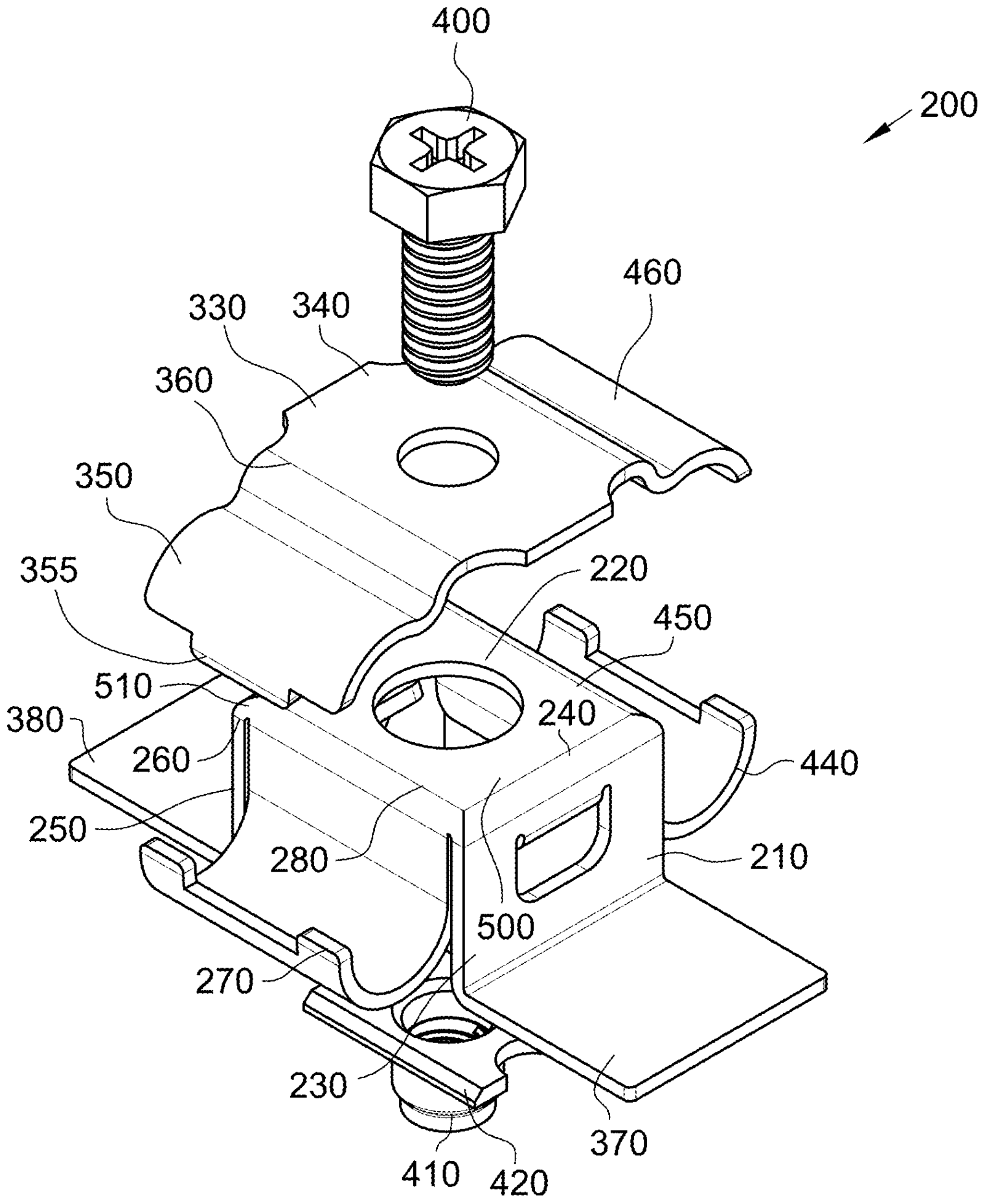
FIG. 7 is an exploded top perspective view of the clamp assembly of FIG. 2.
Figure 8:
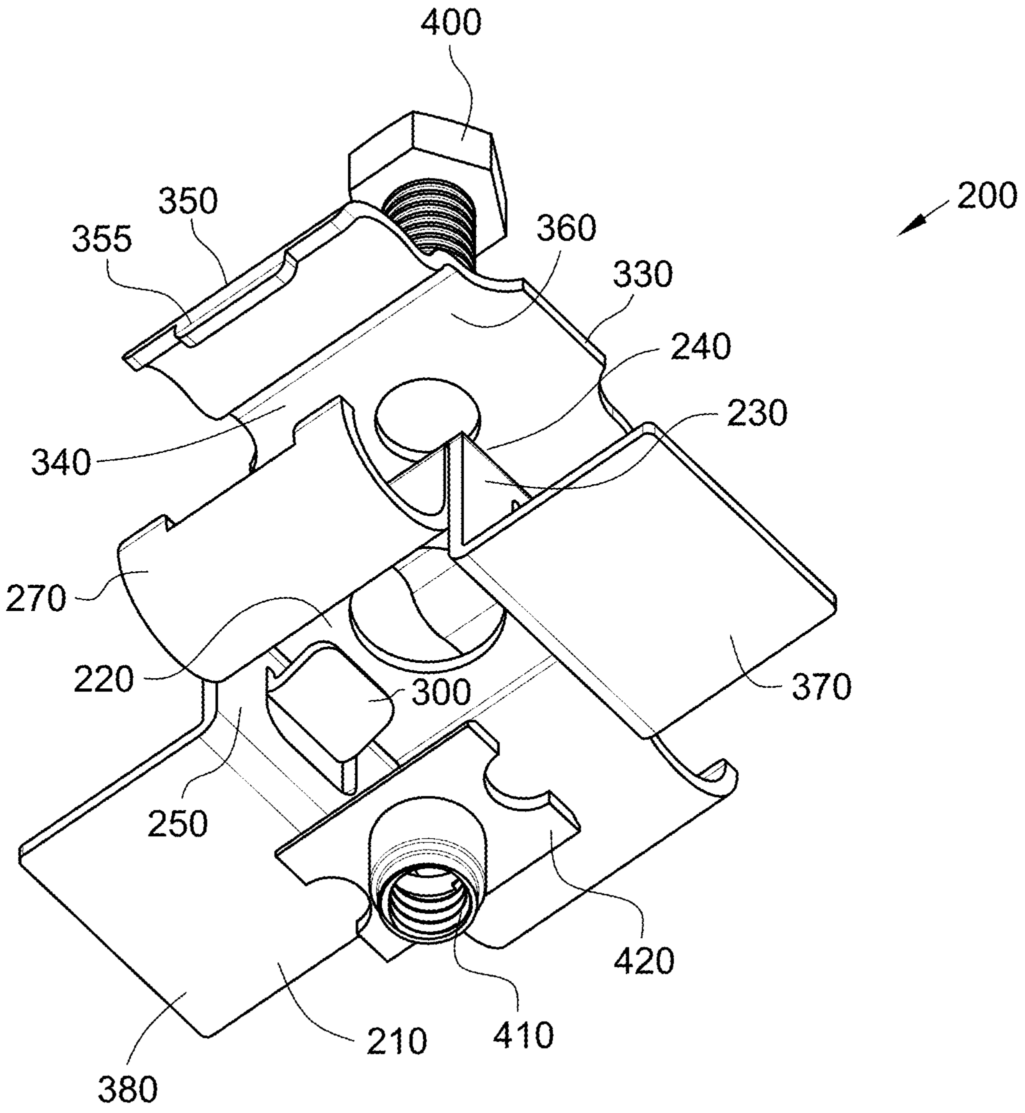
FIG. 8 is an exploded bottom perspective view of the clamp assembly of FIG. 2.
Figure 9:
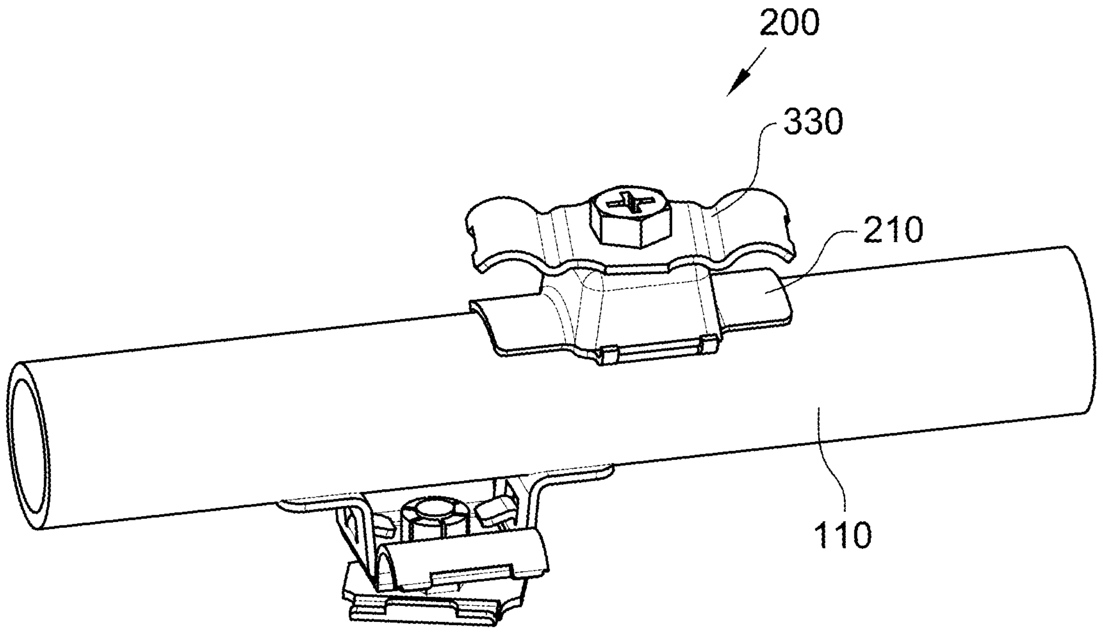
FIG. 9 is an image of the clamp assembly of FIG. 2 mounted on a support rail.

FIG. 2 is a perspective view of a clamp assembly 200 in accordance with this disclosure. FIG. 3 is a side view of the clamp assembly 200 of FIG. 2. FIG. 4 is a side view of the clamp assembly 200 of FIG. 2. FIG. 5 is a section view of the clamp assembly 200 of FIG. 2 taken along line 5-5 of FIG. 3. FIG. 6 is a top view of the clamp assembly 200 of FIG. 2. FIG. 7 is an exploded top perspective view of the clamp assembly 200 of FIG. 2. FIG. 8 is an exploded bottom perspective view of the clamp assembly 200 of FIG. 2. FIG. 9 is an image of the clamp assembly 200 of FIG. 2 mounted on a support rail 110.

As shown, the clamp assembly 200 is for retaining a substantially cylindrical structure 120, such as the tube shown in FIG. 1, in a high vibration environment. The clamp assembly 200 includes a base 210 for fixing the clamp assembly to the support 110, which could be the rail 110 shown in FIGS. 1 and 9. The base 210 has a mounting plate 220 and at least one leg 230 at a first edge 240 of the mounting plate. Typically, the base 210 has a second leg 250 at a second edge 260 opposite the first edge 240. The legs 230, 250 space the mounting plate apart from the support 110.

The base 210 also provides a first partial jaw 270 extending from a first side 280 of the mounting plate 220. The first partial jaw 270 mates with at least one other component in order to retain the substantially cylindrical structure 120.

The base 210 further provides at least one tab 290, 300 extending from a wall 310, 320 of each leg 230, 250. Each tab 290, 300 extends from the corresponding wall 310, 320 towards a center of the mounting plate 220. As shown, in some embodiments, the tabs 290, 300 may comprise a portion of the corresponding first and second leg 230, 250 respectively. The tab 290, 300 is then bent relative to the remainder of the corresponding leg 230, 250. The tabs 290, 300 may then be stamped from the corresponding legs 230, 250.

As shown, each leg 230, 250 may terminate in a corresponding installation segment 370, 380 for installing the clamp assembly 200 on the support 110. The installation segment 370, 380 may then be bend relative to the corresponding legs 230, 250. As shown, the support 110 may be a rail, and the rail may extend from the first leg 230 to the second leg 250.

The clamp assembly 200 also provides a cap 330 for retaining the substantially cylindrical structure 120 against the base 210. The cap 330 includes a fixation plate 340 for fixing the cap to the mounting plate 220, and a second partial jaw 350 extending from a first side 360 of the fixation plate for mating with the first partial jaw 270.

The clamp assembly 200 also provides a nut 410 and bolt 400 to function as a fixation structure. The nut 410 includes or is fixed to a nut plate 420 that extends laterally from an axial direction of the nut.

When the fixation plate 340 of the cap 330 is fixed to the mounting plate 220 of the base 210, typically by way of the nut 410 and bolt 400, the first partial jaw 270 mates with the second partial jaw 350 to define a retention loop 430 for retaining the substantially cylindrical structure 120. When fixed in place, the nut plate 420 is typically discrete from and captivated adjacent the mounting plate 220 by the at least one tab 290, 300 extending from the wall 310, 320 of the corresponding leg 230, 250. In some embodiments, the partial jaws 270, 350 may be provided with a locating feature 355, such as an interlocking tooth, for ensuring proper alignment and preventing rotation of the clamp components during and after fixation.

Accordingly, the nut plate 420 is not fixed to the mounting plate 220, but is movable relative thereto. Once the nut 410 and bolt 400 are tightened, the nut plate 320 is compressed against the mounting plate 220. However, if the fixation structure loosens, such that it can move relative to the mounting plate 220, it would still be captivated by the tabs 290, 300.

In typical embodiments, such as that shown, in addition to the first partial jaw 270 and the second partial jaw 350, the base 210 further includes a third partial jaw 440 extending from a second side 450 of the mounting plate 220 opposite the first side 280. The cap 330 further includes a fourth partial jaw 460 extending from a second side 470 of the fixation plate 340 opposite the first side. The fourth partial jaw 460 then mates with the third partial jaw 440 when the fixation plate 340 of the cap 330 is fixed to the mounting plate 220 of the base 210. When assembled such that the third partial jaw 440 mates with the fourth partial jaw 460, the partial jaws define a second retention loop 480 for retaining a second substantially cylindrical structure, or a second portion of the substantially cylindrical structure 120 retained by the retention loop 430.

As discussed above, the substantially cylindrical structure 120 may be a component of an electrical circuit. In some embodiments, the substantially cylindrical structure 120 may be a bushing for retaining a cable or tube forming a portion of an electrical circuit. For example, the cable or tube may be an Inconel tube containing electrical conductors 130, 140, and the clamp may directly retain the Inconel tube or it may instead retain a bushing which in turn retains the Inconel tube.

Accordingly, the electrical circuit may be an overheat detection system. The electrical conductors 130, 140 or a material separating the electrical conductors, such as eutectic salt 150, are temperature sensitive such that a high temperature decreases the resistance of the circuit.

As shown, the mounting plate 220 is substantially rectangular, such that it has four sides 280, 450, 500, 510. In such an embodiment, the first edge 240 is at the third side 500 and the second edge 260 is at the fourth side 510 opposite the first side. Accordingly, the two legs 230, 250 and the first and third partial jaws 270, 440 all extend from distinct sides of the mounting plate 220.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A clamp assembly for retaining a substantially cylindrical structure in a high vibration environment comprising:
- a base for fixing the clamp assembly to a support, the base having:
  - a mounting plate;
  - at least one leg at a first edge of the mounting plate for spacing the mounting plate apart from the support;

a first partial jaw extending from a first side of the mounting plate; and at least one tab extending from a wall of the at least one leg towards a center of the mounting plate, a cap for retaining the substantially cylindrical structure against the base, the cap having:

a fixation plate for fixing to the mounting plate; and a second partial jaw extending from a first side of the fixation plate for mating with the first partial jaw, and a fixation structure comprising a bolt and a nut, the nut comprising an integral nut plate extending laterally from an axial direction of the nut, wherein the nut and nut plate are not rotatable relative to each other, wherein, when the fixation plate of the cap is fixed to the mounting plate of the base, the first partial jaw mates with the second partial jaw to define a retention loop for retaining the substantially cylindrical structure, and wherein the nut plate is discrete from and captivated adjacent the mounting plate by the at least one tab extending from the wall of the at least one leg.

2. The clamp assembly of claim 1, wherein the base comprises a third partial jaw extending from a second side of the mounting plate opposite the first side, and wherein the cap comprises a fourth partial jaw extending from a second side of the fixation plate opposite the first side for mating with the third partial jaw, and wherein when the fixation plate of the cap is fixed to the mounting plate of the base the third partial jaw mates with the fourth partial jaw to define a second retention loop for retaining a second substantially cylindrical structure or a second portion of the substantially cylindrical structure than the retention loop.

3. The clamp assembly of claim 2, wherein the at least one leg is two legs, where a first of the two legs extends from the first edge of the mounting plate and a second of the two legs extends from a second edge of the mounting plate opposite the first edge, such that the two legs locate the mounting plate relative to and spaced apart from the support, and wherein the at least one tab is two tabs, with a first of the two tabs extending towards the center of the mounting plate from the wall of the first leg, and wherein a second of the two tabs extends towards the center of the mounting plate from a wall of the second leg, such that the first tab and the second tab extend substantially towards each other and combine to captivate the nut plate.

4. The clamp assembly of claim 3, wherein the mounting plate is substantially rectangular, such that it has four sides, and wherein the first edge is at a third side and the second edge is at a fourth side opposite the third side, such that the legs and partial jaws all extend from distinct sides of the mounting plate.

5. The clamp assembly of claim 2, wherein the substantially cylindrical structure is a portion of an electrical circuit.

6. The clamp assembly of claim 2, wherein the substantially cylindrical structure is a bushing for retaining a cable or tube forming a portion of an electrical circuit.

7. The clamp assembly of claim 6, wherein the cable or tube is an Inconel tube containing electrical conductors.

8. The clamp assembly of claim 7, wherein the electrical circuit is an overheat detection system, and wherein the electrical conductors or a material separating the electrical conductors are temperature sensitive, such that a high temperature decreases the resistance of the circuit.

9. The clamp assembly of claim 1, wherein the at least one leg is two legs, where a first of the two legs extends from the first edge of the mounting plate and a second of the two legs extends from a second edge of the mounting plate opposite the first edge, such that the two legs locate the mounting plate relative to and spaced apart from the support, and wherein the at least one tab is two tabs, with a first of the two tabs extending towards the center of the mounting plate from the wall of the first leg, and wherein a second of the two tabs extends towards the center of the mounting plate from a wall of the second leg, such that the first tab and the second tab extend substantially towards each other.

10. The clamp assembly of claim 9, wherein the first tab and the second tab comprise a portion of the corresponding first and second leg respectively bent relative to the remainder of the corresponding leg.

11. The clamp assembly of claim 10, wherein each of the first tab and the second tab is stamped from the corresponding leg.

12. The clamp assembly of claim 1, wherein each leg of the at least one leg terminates in a corresponding installation segment for installing the clamp assembly on the support, wherein the installation segment is bent relative to the corresponding leg.

13. The clamp assembly of claim 12, wherein the support is a rail, and wherein the rail extends from a first leg of the at least one leg to a second leg of the at least one leg.

14. A clamp assembly for retaining a structure in a high vibration environment comprising:

a base for fixing the clamp assembly to a support, the base having:

a mounting plate;

two legs at opposite edges of the mounting plate for spacing the mounting plate apart from the support; and a tab extending from a wall of each of the two legs towards a center of the mounting plate; and a fixation structure comprising a bolt and a nut for fixing a secondary structure to the mounting plate, the nut comprising an integral nut plate extending laterally from an axial direction of the nut, wherein the nut and nut plate are not rotatable relative to each other, wherein the nut plate is discrete from and captivated adjacent the mounting plate by the at least one tab extending from the wall of the at least one leg.

15. The clamp assembly of claim 14, wherein the base further comprises a first partial jaw extending from a first side of the mounting plate for mating with a second partial jaw extending from a fixation plate for fixing to the mounting plate, and wherein the first and second partial jaws combining to define a retention loop for retaining a substantially cylindrical structure.

16. The clamp assembly of claim 15, wherein the base further comprises a third partial jaw extending from a second side of the mounting plate opposite the first side for mating with a fourth partial jaw extending from the fixation plate, and wherein the third and fourth partial jaws combine to define a second retention loop for retaining a second substantially cylindrical structure or a second portion of the substantially cylindrical structure.

17. The clamp assembly of claim 16, wherein the mounting plate is substantially rectangular, such that it has four sides, and wherein the two opposite edges are at a third and fourth side respectively, such that the legs and partial jaws all extend from distinct sides of the mounting plate.

* * * * *